United States Patent
Rogers

(10) Patent No.: US 9,789,560 B2
(45) Date of Patent: Oct. 17, 2017

(54) ARC WELDING TORCH HAVING A VARIABLE ELECTRODE RECEIVER

(76) Inventor: Jesse Rogers, Penn Yan, NY (US)

(*) Notice: Subject to any disclaimer, the term of this patent is extended or adjusted under 35 U.S.C. 154(b) by 1525 days.

(21) Appl. No.: 13/105,802

(22) Filed: May 11, 2011

(65) Prior Publication Data

US 2011/0278274 A1    Nov. 17, 2011

Related U.S. Application Data

(60) Provisional application No. 61/333,945, filed on May 12, 2010.

(51) Int. Cl.
*B23K 9/16* (2006.01)
*B23K 9/167* (2006.01)
*B23K 9/29* (2006.01)

(52) U.S. Cl.
CPC .............. *B23K 9/167* (2013.01); *B23K 9/296* (2013.01)

(58) Field of Classification Search
USPC .................. 219/54, 61.4, 74, 75, 136, 137 R
See application file for complete search history.

(56) References Cited

U.S. PATENT DOCUMENTS

| | | | |
|---|---|---|---|
| 1,707,433 A | 4/1929 | Hand | |
| 1,910,668 A | 5/1933 | Bevard | |
| 2,014,226 A | 9/1935 | Catlett | |
| 2,350,426 A | 6/1944 | Thompson | |
| 2,358,158 A | 9/1944 | Gibbert | |
| 2,361,896 A | 10/1944 | Yeadon | |
| 2,395,228 A | 2/1946 | Liniger | |
| 2,463,145 A | 3/1949 | Buchanan | |
| 2,512,705 A | 6/1950 | Anderson | |
| 2,532,807 A | 12/1950 | Girard et al. | |
| 3,219,793 A | 11/1965 | Mahoney | |
| 3,263,056 A | 7/1966 | Tallman | |
| 4,194,107 A | 3/1980 | Klasson | |
| 4,237,365 A | 12/1980 | Lambros et al. | |
| 4,543,461 A | 9/1985 | Hill | |
| 4,588,252 A | 5/1986 | Ice | |
| 5,473,131 A * | 12/1995 | Sperling | 219/75 |
| 6,260,857 B1 * | 7/2001 | Wienhold et al. | 279/62 |
| 6,884,958 B2 | 4/2005 | Samler | |
| 6,995,331 B2 | 2/2006 | Samler | |
| 7,053,329 B2 | 5/2006 | Samler | |

(Continued)

OTHER PUBLICATIONS

PCT/US2011/036198—An Unofficial Copy of an International Search Report and Written Opinion Dated Sep. 13, 2011 for International PCT Application PCT/US2011/036198 Filed May 12, 2011; Applicant/Inventor Jessie Rogers; PCT/US2011/036198 Corresponds to U.S. Appl. No. 13/105,802.

(Continued)

*Primary Examiner* — Brian Jennison
(74) *Attorney, Agent, or Firm* — Duane C. Basch; Basch & Nickerson LLP

(57) ABSTRACT

An arc welding torch having a variable electrode receiving aperture including a number of discrete wedges guided within a conical interior surface of a housing to enable the use of electrodes of various diameters without changing components of the torch. An adjusting collar engages the wedges and forms an adjustable opening for an electrode to be inserted therein. Rotation of a tailpiece of the torch handle adjusts the position of the wedges and secures the electrode in position.

19 Claims, 5 Drawing Sheets

(56) References Cited

U.S. PATENT DOCUMENTS

| | | |
|---|---|---|
| 2006/0151453 A1* | 7/2006 | Gordon et al. .......... 219/137.61 |
| 2007/0215587 A1* | 9/2007 | Centner ................... 219/137.62 |
| 2008/0190899 A1 | 8/2008 | Sugahara et al. |
| 2009/0050606 A1 | 2/2009 | Smith |
| 2010/0066038 A1* | 3/2010 | Young et al. ................. 279/140 |

OTHER PUBLICATIONS

CK Worldwide Inc.; webpage 1 page; CK Worldwide, Inc., PO Box 1936, Auburn, WA 98071; c. CKWorldwide, Inc. 2005.

\* cited by examiner

ARC WELDING TORCH HAVING A VARIABLE ELECTRODE RECEIVER

This application claims priority under 35 USC 119(e) from U.S. Provisional Patent Application No. 61/333,945, filed May 12, 2010, by Jesse Rogers, which is hereby incorporated by reference in its entirety.

A self-centering adjustable electrode receiver, for a gas shielded welding torch, includes a plurality of electrode securing wedges that are coordinated to uniformly contact electrodes of various shapes, diameters, lengths and orientations. The adjustable wedges provide a robust and uniform contact with the electrode and thus reduce the likelihood of resistive heating in the contact region. Premature wear of the threads and the internal surfaces of conventional collets, will also be averted by eliminating a multitude of changeovers, as well as the loss or misplacement of unused collets.

BACKGROUND AND SUMMARY

Gas tungsten arc welding (GTAW), also known as tungsten inert gas (TIG) welding, is an electrical welding process that uses the arc from a tungsten electrode to produce heat sufficient to create a plasma "puddle" to weld or fuse work pieces together. TIG welding can be used for a number of materials and alloys and is thus a very versatile welding process. However, the welding parameters and electrode sizes are often adjusted based upon the material being welded. For example, the diameter of the non-consumable tungsten electrode can vary between about 0.5 mm and about 6.4 mm (0.020 in.-0.25 in.) depending upon the workpiece material and type of weld, and the length of the electrodes can range from about 75 mm to about 610 mm (3 in.-24 in.).

The weld area is protected from atmospheric contamination by an inert shielding gas, such as argon. A welding power supply provides an electrical current that, upon creation of an arc between the electrode and the material being welded, produces concentrated thermal energy sufficient to weld the piece(s). The focused heat is sufficient to place the contact area, as well as an optional filler rod, into a plasma state. Air cooling systems are most often used for low-current operations, however water cooling is generally required within the torch head for a majority of TIG welding systems in order to dissipate heat in higher current applications or in applications requiring longer duty cycles.

Tungsten arc welding gas shielding torches employ dedicated collets and collet bodies for holding only one specific diameter electrode within the torch head. Electrode collets are typically made from copper in a tubular shape and have at least two longitudinal gaps or slots to allow the diameter of the collet to be radially compressed when moved in relationship to the interior conical shape of an adjacent collet body. This compression of the collet minimally reduces the opening therein to engage and secure the electrode within the nominal internal radial area of the collet. Since the collet is compressed against the electrode over a relatively small area, the current density per unit area is significant and substantial heat may be generated due to the electrically resistive connection to the electrode, which also may perpetuate peripheral arcing within the collet. Accordingly, the electrode, as well as the collet, has a tendency to erode over time due the effect of repetitive expanding and contracting caused by both the resistive and conducted heating and subsequent cooling. The situation is further aggravated due to the copper collet having a coefficient of thermal expansion of $9.8 \times 10^{-6}$ in/in/° F., whereas the tungsten electrode only expands about half as much ($3.9 \times 10^{-6}$ in/in/° F.), thereby potentially causing a loose fitting electrode while welding, potentially further increasing the electrical resistance and/or causing the electrode to become unstable and to move within torch head.

Collets and collet bodies are provided in at least six aperture sizes to accommodate various diameters of the job specific electrode. Therefore a significant limitation of the existing collets is that each electrode size requires a specific corresponding collet and collet body. Consequently, each time an alternate electrode diameter is required, the collet assembly must be interchanged as well. For example, it is required to have on hand at least one 1/16 inch collet and collet body to accompany a 1/16 inch tungsten electrode, as well as a 1/8 inch collet and collet body for a 1/8 inch electrode, and so forth. This unfortunately becomes a logistical challenge, as well as a time consuming exercise each time the electrode is interchanged for another size. Moreover, the use of collets prevents the reversal of electrodes that may develop a bead or enlarged end.

When an electrode comes in direct contact with a work piece the tip becomes contaminated when "foreign" metal that is transferred and adheres to the tip of the tungsten electrode. This added material produces a mushrooming of the tip and requires the electrode to be either reground or replaced. The use of an adjustable electrode receiver as disclosed herein, however, provides a sufficient opening or adjustability for the mushroomed end of the electrode to be flipped, end for end, and reinserted as the enlarged and contaminated end is passed through the adjustable opening. Thus, it is a further objective to provide an electrode receiver that will allow insertion of the expanded/contaminated end therethrough, and thereby avoiding a problem with the use of sized collets to hold electrodes.

The internal metal parts of a torch are preferably made of copper or brass in order to conduct electrical current and transfer heat with minimal resistance across a relatively small contact area. The body of the torch is made of heat-resistant, insulating plastics and similar materials for both covering the metal components as well as providing insulation from heat and electricity to protect the welder. Additionally, provisions may be provided to allow a constant flow of the shielding gas to pass through the torch handle and electrode receiver to the work piece area in order to provide an inter gas atmosphere in proximity to the weld.

In the interest of versatility and convenience, a welder should be enabled to select and use any size electrode at anytime, to effect optimal welding, without the need to reconfigure the electrode receiver within the torch head. In other words the configuration of the torch head and associated housing should not dictate the size or shape of an electrode. Therefore, an adjustable electrode receiver, that can be varied as needed to accommodate a variety of different size electrodes, provides a distinct advantage when using an electric welding torch, such as the case with TIG welding.

The embodiments disclosed herein are directed to an improved torch with an adjustable or variable electrode receiver that eliminates the need for collets in order to enable use of a plurality of electrode sizes. In the improved torch a plurality of electrically conductive, adjustable wedges are employed to provide an adjustable electrode aperture through which electrodes of various sizes, and shapes, may be placed and held.

In accordance with one aspect of the disclosed embodiments, there is provided an electric arc welding torch having an adjustable electrode receiver, comprising: a plurality of radially positioned electrode securing wedges forming an aperture therebetween; an internal conical surface, each securing wedge traversing, in unison in a longitudinal direction to form a variable aperture therebetween; an electrode passing through said variable aperture in contact with each securing wedge, said securing wedges further providing electrical contact between the electrode and the conical surface; and an adjusting collar positioning the securing wedges longitudinally along the internal conical surface, said adjusting collar forcing said wedges into secure contact with the electrode, wherein the aperture is adjustable for use with a range of electrode diameters.

In accordance with another aspect of the disclosed embodiments, there is provided a method for using a welding torch in combination with an arc welder, comprising: providing an adjustable electrode receiver having a plurality of electrically conductive wedges defining an aperture therein, said aperture being suitable for receiving a plurality of electrodes of different diameters; inserting a first electrode into the aperture in the electrode receiver; adjusting the wedges to be in electrical contact with an outer surface of the first electrode; and securing the first electrode in a fixed position using the wedges by applying a force to said wedges via a threaded collar in contact with the first electrode.

In accordance with a further aspect of the disclosed embodiments, there is provided A welding system, comprising: a power supply; an inert gas supply; and a welding torch electrically connected to the power supply and coupled to the inert gas supply, said torch including an adjustable electrode receiver suitable for receiving a plurality of electrodes of different diameters.

Other and further objects, features and advantages will be evident from a reading of the following specification and by reference to the accompanying drawings forming a part thereof, wherein the examples of the presently preferred embodiments are given for the purposes of disclosure.

Figure 1:
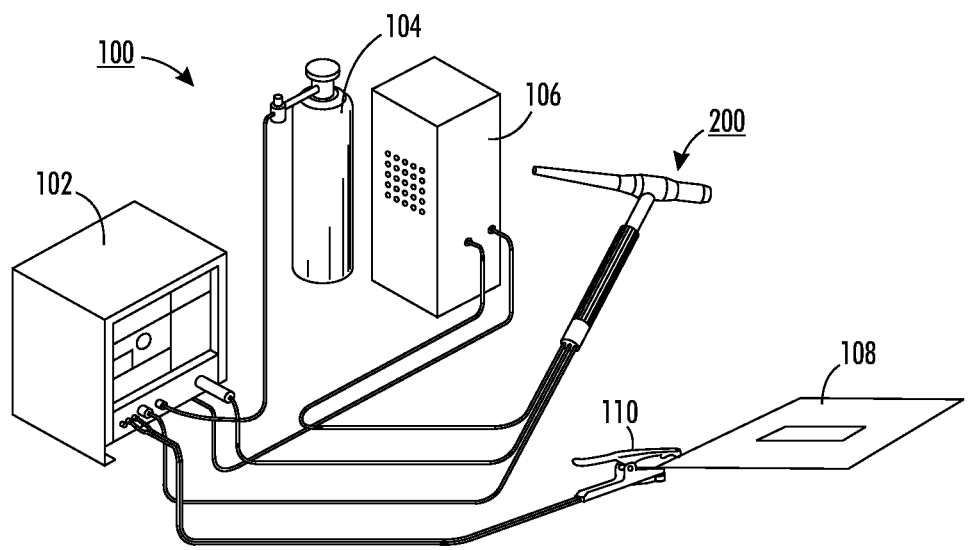
FIG. 1 is a perspective view of a TIG welding system, employing the welding torch having an adjustable electrode receiver.

The various embodiments described herein are not intended to limit the invention to those embodiments described. On the contrary, the intent is to cover all alternatives, modifications, and equivalents as may be included within the spirit and scope of the welding torch and adjustable electrode receiver as defined by the appended claims.

DETAILED DESCRIPTION

Referring now to the drawings where the showings are for the purpose of illustrating a preferred embodiment of the electrode receiver.

The system of FIG. 1 includes several elements of a gas tungsten arc welder. In one embodiment welding system 100 includes a power supply 102, inert gas supply 104, water/liquid cooler 106 and torch assembly 200. In practice, workpiece 108 is electrically connected to power supply 102 to provide either −DC, +DC or AC through clamp and return cable 110 to workpiece 108. Torch 200 provides means for delivering the inert gas as well as an arc formed within an air gap between the tip of the tungsten electrode and the work piece 108, to generate the heat required to fuse the work pieces together. Torch 200 is further connected to a water or chilled liquid supply for cooling when a high current and/or extended duration welding operation is performed.

Figure 2:
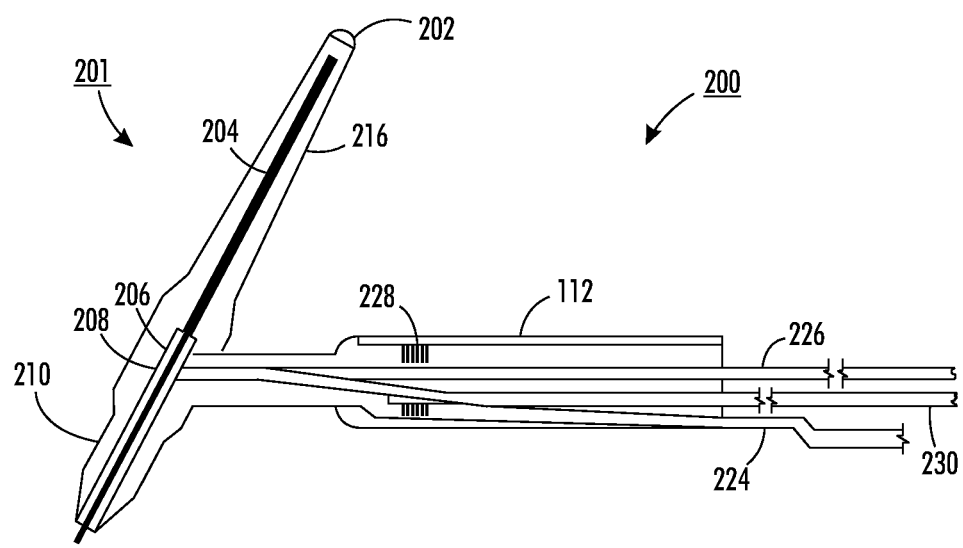
FIG. 2 is a cut away view of the torch handle of the system in FIG. 1.
Figure 3:
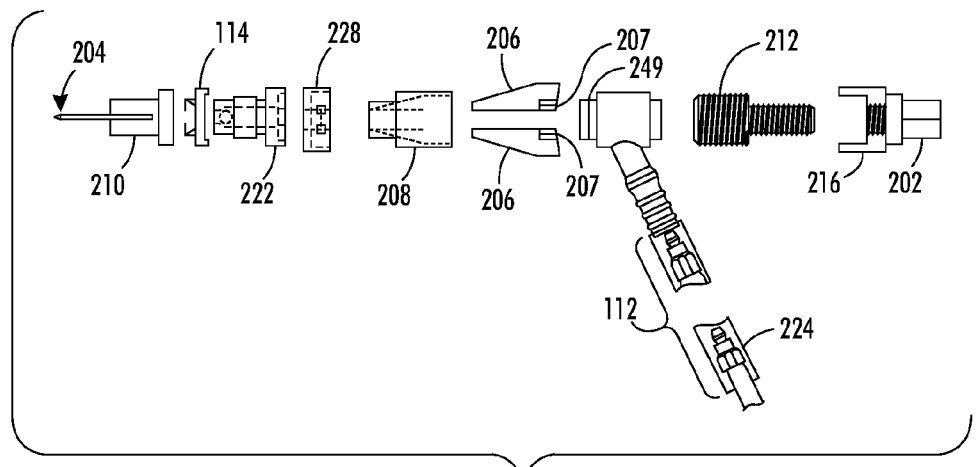
FIG. 3 is an assembly view of the components within the housing of the torch head of FIG. 2.

Also considering FIGS. 2 and 3 in combination with FIG. 1, torch 200 is shown comprising three discrete inputs, water 226, inert gas 224, and electrical current 230 which may be connected to the torch within handle region 112. Also disclosed with respect to a conventional torch handle design, it will be appreciated that various aspects of the disclosed electrode receiver and aperture may indeed be used in or applied to alternative welding torch configurations, such that he shape and configuration of the torch itself may preferably take different forms.

The operative mechanical elements of the electrode receiver within a housing of the torch 200, particularly the torch head 201, include at least two wedges 206, within the interior conical surface of wedge guide housing 208. The electrode securing wedges 206 are maintained in forcible contact with electrode 204 by wedge actuator 212. Manifold 114 provides a channel for inert gas to be released with a shroud 210 to concentrate the inert gas in the region of the arc extending between the work piece 108 and the electrode 204. The end of the torch head typically includes a tailpiece 216 that encloses that portion of the electrode 204 extending through the head 201.

With respect to FIG. 3, torch 200 is shown in an exploded view where electrode 204 is inserted along the interior surface of wedges 206 and clamped therein by a force applied to the ends 207 by an actuator or adjusting collar 212. In the depicted embodiment, the force is provided by tailpiece 216 being rotated and a threaded surface of mating member 212 being advanced or retracted in response to the rotation of the tailpiece. It will be further appreciated that a circulating collar 228 or similar means for cooling the components of the torch head 201 is provided in association with the handle/housing via lines passing through housing 249.

Figure 4A:
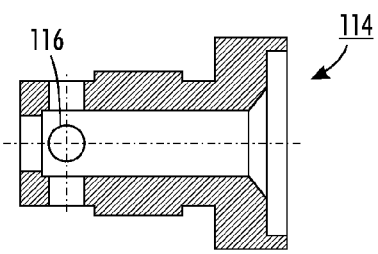
FIGS. 4A and 4B are, respectively, a cross-sectional side and an end view of a gas manifold of the welding torch.
Figure 4B:
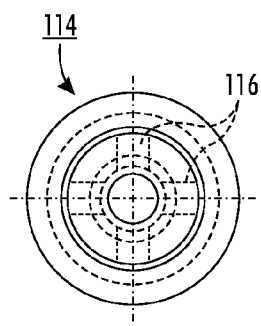
Figure 5A:
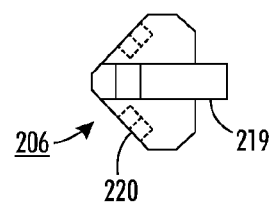
FIGS. 5A and 5B are, respectively, an end view and a planar view of an exemplary electrode securing wedge.
Figure 5B:
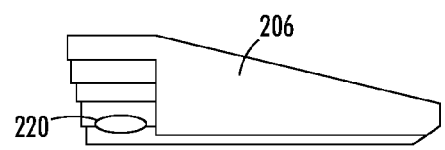
Figure 6A:
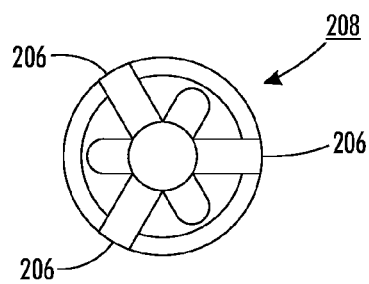
FIGS. 6A and 6B are, respectively, a top and a planar view of a wedge guide housing depicting a conical surface therein.
Figure 6B:
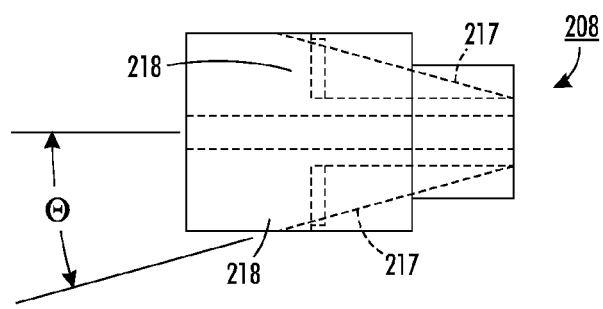
Figure 7A:
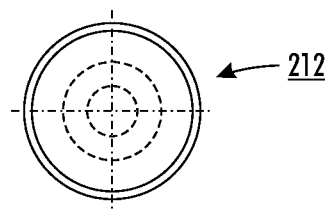
FIGS. 7A and 7B are, respectively, an end and a planar view of the wedge actuator or adjusting collar.
Figure 7B:
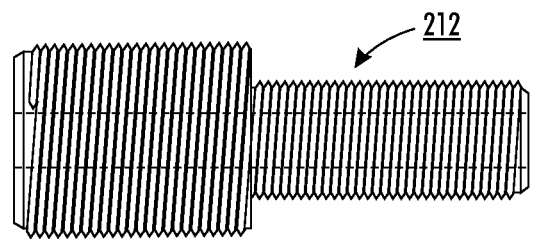

As specifically illustrated in FIGS. 4A-7B, each of the operative elements of the electrode receiver embodiments will be further described. FIGS. 4A and 4B represent a gas manifold 114 having radial positioned ports 116 for the channeling of an inert gas, such as helium or argon, into the work area. As illustrated in FIGS. 5A and 5B, depicting an exemplary one of three electrode securing wedges 206, each of the wedges are positioned and slide within channels formed along the interior conical surface 217 of wedge guide housing 208 as depicted in FIGS. 6A and 6B. Wedges 206 may be made from any electrically conductive material, such as a #660 bronze or similar metal. In one aspect the wedges have a profile generally taking the form of a right triangle with a protruding shoulder or guide key 219 extending along the hypotenuse. The guide key of wedges 206 have corresponding keyways within guide housing 208 to provide consistent alignment between wedge actuator 212 and electrode 204. Wedges 206, together with housing 208, are caused to tighten about electrode 204 by wedge actuating or adjusting collar 212, as depicted in FIGS. 7A and 7B, as a result of rotating tailpiece 216 in a clockwise direction. Rotation of the tailpiece causes the displacement of actuator collar 212, which in turn translates wedges 206 along the interior inclined conical surface 217 of wedge guide housing 208.

Resilient members such as compression springs 218 provide a force onto or between wedges 206 sufficient to cause the wedges to move up the ramp or conical surface of wedge housing 208 when actuator 212 is backed off in order to increase the diameter of the electrode opening. It will be further appreciated that while the springs 218 are depicted as lying between adjacent wedges 206, or more particularly, recesses 223 on angled surfaces of the wedges, it is also possible to provide other wedge and spring configurations that bias the wedges to tend to move outward (and therefore upward within the housing 208).

Notably, the rate of change of the orifice diameter formed by anterior surface of wedges 206 is a function of the pitch of the thread, or turns per inch (TPI) on wedge actuator 212, as well as included angle Θ (FIG. 6B) or slope, of the posterior surface of the hypotenuse of wedge 206. Accordingly, the corresponding interior conical surface of wedge guide housing 208 share a common slope angle, typically in the range of 15-20 degrees. This pair of co-sliding planes further serves to maintain parallelism between the interior surface of wedges 206, thereby providing an uniform contact region along electrode 204. Consequently, the minimum and maximum aperture diameter (D) is a function of the sine of angle Θ. For example, if the wedge angle is 17 degrees and the operating length of the inclined side is 0.5 in, the wedge range of motion will be y=(x) (sin Θ) or y=(0.5 in)(0.29)~=0.145 in, therefore the max aperture opening would be twice y, or about 0.290 in., which would readily accommodate each of the diameters of the aforementioned electrodes.

Figure 8:
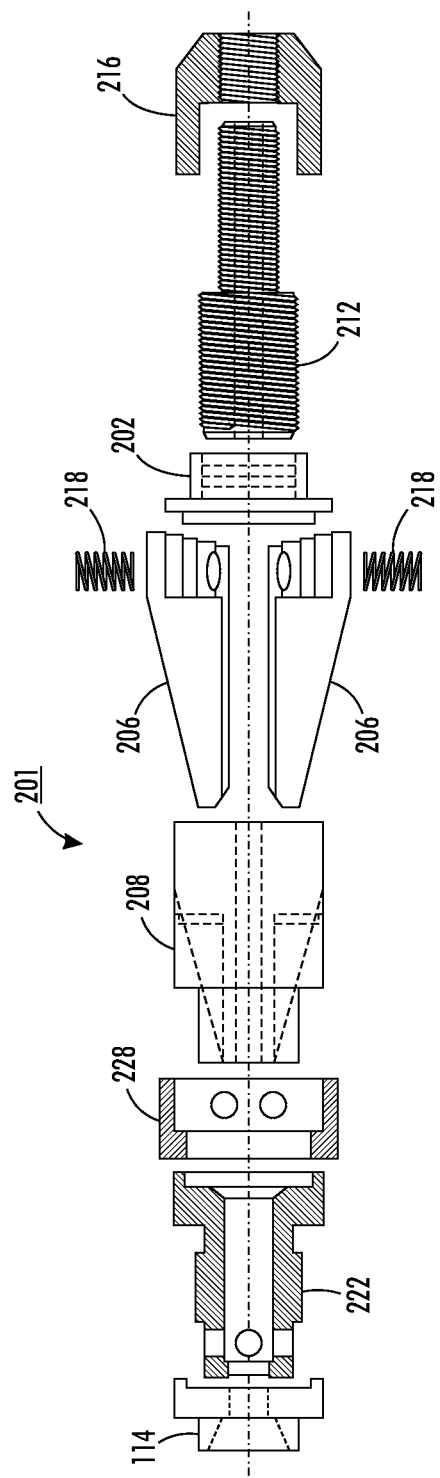
FIG. 8 is an exploded assembly view of the electrode receiver assembly in accordance with the disclosed embodiments.

Generally referring now to FIG. 8, the relationships of the various constructive elements of the electrode receiver are depicted in an exploded view. The distal and proximal ends of electrode receiver 201 allow for an electrode to pass completely therethrough, providing a torch handle that is independent of electrode length, or diameter. As previously noted, electrode 204 (not shown in FIG. 8) passes into the center of the gas manifold 114 and entirely through the length of electrode receiver 101 to the proximal end within tailpiece 216.

In recapitulation, as illustrated in the figures, a variable sized electrode receiver is provided to retain electrode 204 within the torch head in a position axially extending through manifold 114 and centrally located within an inert gas atmosphere. As illustrated, one embodiment of electrode receiver 201 comprises a plurality of electrode securing wedges 206 positioned radially within a guide housing 208. The wedges form an aperture therebetween, where the aperture size is adjustable based upon the position of the wedges relative to an internal conical surface 217 within the housing 208. Each securing wedge traverses the conical surface in a longitudinal direction to form the variable aperture. In use an electrode 204 passes through said variable aperture in contact with each securing wedge, said securing wedges further providing electrical contact between the electrode and the conical surface, and thus the source of electrical current. An adjusting collar positions the securing wedges longitudinally along the internal conical surface, where the adjusting collar forces the wedges into secure contact with the electrode, and the aperture is adjustable for use with a range of electrode diameters. The torch head may further include a manifold 114 for gas containment, seat 222 working in relationship with wedge guide housing 208 having wedges 206 retained therein. Springs 218 serve to provide a tendency force against wedge 206 so as to encourage a constant contact with wedge guide 208 in the absence of electrode 204. Conducted heat from the arc through electrode receiver 201 is dissipated into the liquid circulating collar 228, whereby the heat energy is further transferred to cooler 106 via liquid lines and expelled as warm air. Back cap 202 threads into tail piece 216 to prevent any inert gas from escaping through the distal end of electrode receiver 201.

As discussed previously, the aperture sizing is dependent upon the geometric relationship of the conical surface 217 and electrode securing wedges 206, and may be used to produce an aperture of diameter D to handle electrode diameters from about 0.020 in. to about 0.250 in, and more preferably from about 0.040 in. to about 0.125 in. As will be appreciated the apertures may be adjustable to diameters slightly smaller than the smallest electrode diameter noted and slightly larger than the largest diameter of the electrode in order to accommodate imperfections in, and contamination of, the electrodes.

Use of the disclosed embodiments is believed to result in improved productivity by at least eliminating the need to change collets when switching between various electrode diameters or shapes. For example, one method for using the disclosed welding torch in combination with an arc welder, includes providing an adjustable electrode receiver having a plurality of electrically conductive wedges defining an aperture, where the aperture is suitable for receiving a plurality of electrodes of different diameters. To use the torch, an electrode is inserted into the aperture in the electrode receiver, the wedges are adjusted to be in electrical contact with the outer surface of the electrode, and the electrode is secured in a fixed position by applying a force to the wedges via a threaded collar or similar mechanism in contact with the electrode. Another electrode may then be used by readjusting the position of the threaded collar in contact with the electrode securing wedges to release the first electrode, and removing the first electrode from the electrode aperture before inserting a second electrode of a different diameter into the electrode aperture. Once inserted the securing wedges are adjusted to be in electrical contact with an outer surface of the second electrode; and once again used to secure the second electrode in a fixed position by applying a force to the securing wedges via the threaded collar in contact with the wedges.

It will be appreciated that several of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. An electric arc welding torch having an adjustable electrode receiver, comprising:
   a plurality of radially positioned electrode securing wedges forming an aperture therebetween on a first end of the torch;
   an internal conical surface in contact with each securing wedge such that each securing wedge traverses, in unison, the conical surface in a longitudinal direction to form a variable aperture therebetween;

an electrode passing completely through said variable aperture in contact with each securing wedge, said securing wedges further providing electrical contact between the electrode and the conical surface, wherein a longitudinal position of the electrode is adjustable to permit electrodes of varying lengths to be secured by the variable aperture; and an adjusting collar positioning the securing wedges longitudinally along the internal conical surface;

said adjusting collar forcing said wedges into secure contact with the electrode, wherein the aperture is adjustable over a range of diameters that is greater than the range of electrode diameters usable with said torch.

2. The welding torch according to claim 1 including at least three electrode securing wedges.

3. The welding torch according to claim 1 wherein said electrode securing wedges each include an electrode contact surface and a shoulder on the opposite side thereof, said shoulder slidably interacting with a corresponding receiving slot on said conical surface.

4. The welding torch according to claim 1 further comprising a cooling collar in contact with each of said electrode securing wedges.

5. The welding torch according to claim 1 where said adjusting collar further comprises a threaded actuator, and wherein upon rotation of said threaded actuator the longitudinal position of the electrode securing wedges is adjusted thereby adjusting the electrode aperture size.

6. The welding torch according to claim 1 further including at least one resilient member associated with each electrode securing wedge, where each electrode securing wedge is biased toward the internal conical surface by the resilient member.

7. The welding torch according to claim 6 wherein said resilient member is a coil spring positioned between the electrode securing wedge and each of its adjacent wedges.

8. The welding torch according to claim 1 wherein the electrode contact surface of each electrode securing wedge provides a continuous region of contact with the electrode.

9. The welding torch according to claim 1, further including a tailpiece having a longitudinal recess along the central axis thereof, said recess receiving the electrode passing through the aperture.

10. The welding torch according to claim 5, wherein said a tailpiece is operatively connected to said threaded actuator such that rotation of the tailpiece results in the adjustment of the electrode aperture size.

11. A method for using a welding torch in combination with an arc welder, comprising:

providing an adjustable electrode receiver having a plurality of electrically conductive wedges defining an aperture therein, said aperture being suitable for receiving a plurality of electrodes of different diameters;

inserting a first electrode into and through the aperture in the electrode receiver;

adjusting the wedges to be in electrical contact with an outer surface of the first electrode, wherein a longitudinal position of the electrode is adjustable to permit electrodes of varying lengths to be secured by the variable aperture; and securing the first electrode in a fixed position using the wedges by applying a force to said wedges via a threaded collar in contact with the wedges, wherein said collar is operatively associated with a tailpiece of the torch, said collar positioning the securing wedges longitudinally along an internal conical surface, and where the aperture is adjustable over a range of diameters that is greater than the range of electrode diameters usable with said torch.

12. The method according to claim 11, further comprising:

readjusting the position of the threaded collar in contact with the electrode wedges to release the electrode;

removing the electrode from the electrode aperture;

inserting a second electrode of a different diameter into the electrode aperture;

adjusting the wedges to be in electrical contact with an outer surface of the second electrode; and securing the second electrode in a fixed position using the wedges by applying the force to said wedges via the threaded collar in contact with the wedges.

13. A welding system, comprising:

a power supply;

an inert gas supply;

a welding torch electrically connected to the power supply and coupled to the inert gas supply, said torch including an adjustable electrode receiver suitable for receiving a plurality of electrodes of different diameters; and a housing including:

a plurality of radially positioned electrode securing wedges defining an electrode aperture therebetween;

an internal conical surface in contact with each securing wedge such that each securing wedge traverses, in unison, the conical surface along a longitudinal direction to form a variable aperture therebetween;

an electrode passing completely through said variable aperture in contact with each securing wedge, said securing wedges further providing electrical contact between the electrode and the conical surface; and an adjusting collar positioning the securing wedges longitudinally along the internal conical surface;

said adjusting collar forcing said wedges into secure contact with the electrode, wherein the aperture is adjustable over a range of diameters that is greater than the range of electrode diameters usable with said torch; and a tailpiece, operatively attached to said housing, said tailpiece contacting the adjusting collar such that movement of the tailpiece relative to the housing results in adjustment of the aperture size.

14. The welding system according to claim 13 wherein said electrode securing wedges each include an electrode contact surface and a shoulder on the opposite side thereof, said shoulder slidably interacting with a corresponding receiving slot on said conical surface.

15. The welding system according to claim 13 further comprising a cooling collar in contact with each of said electrode securing wedges.

16. The welding system according to claim 13 where said adjusting collar further comprises a threaded actuator, and wherein upon rotation of said threaded actuator the longitudinal position of the electrode securing wedges is adjusted thereby adjusting the electrode aperture size between less than 0.040 in. and greater than 0.125 in.

17. The welding system according to claim 13 further including at least one resilient member associated with each electrode securing wedge, where each electrode securing wedge is biased toward the internal conical surface by the resilient member.

18. The welding torch according to claim 17 wherein said resilient member is a coil spring positioned between the electrode securing wedge and each of its adjacent wedges.

19. The welding system according to claim 13 wherein the electrode contact surface of each electrode securing wedge provides a continuous region of contact with the electrode.

* * * * *